June 23, 1970    J. W. BUCKLEY    3,517,371
COUPLING LOCKING DEVICE
Filed March 4, 1968    3 Sheets-Sheet 2

INVENTOR
JOSEPH W. BUCKLEY
BY Thomas L. Peterson
ATTORNEY

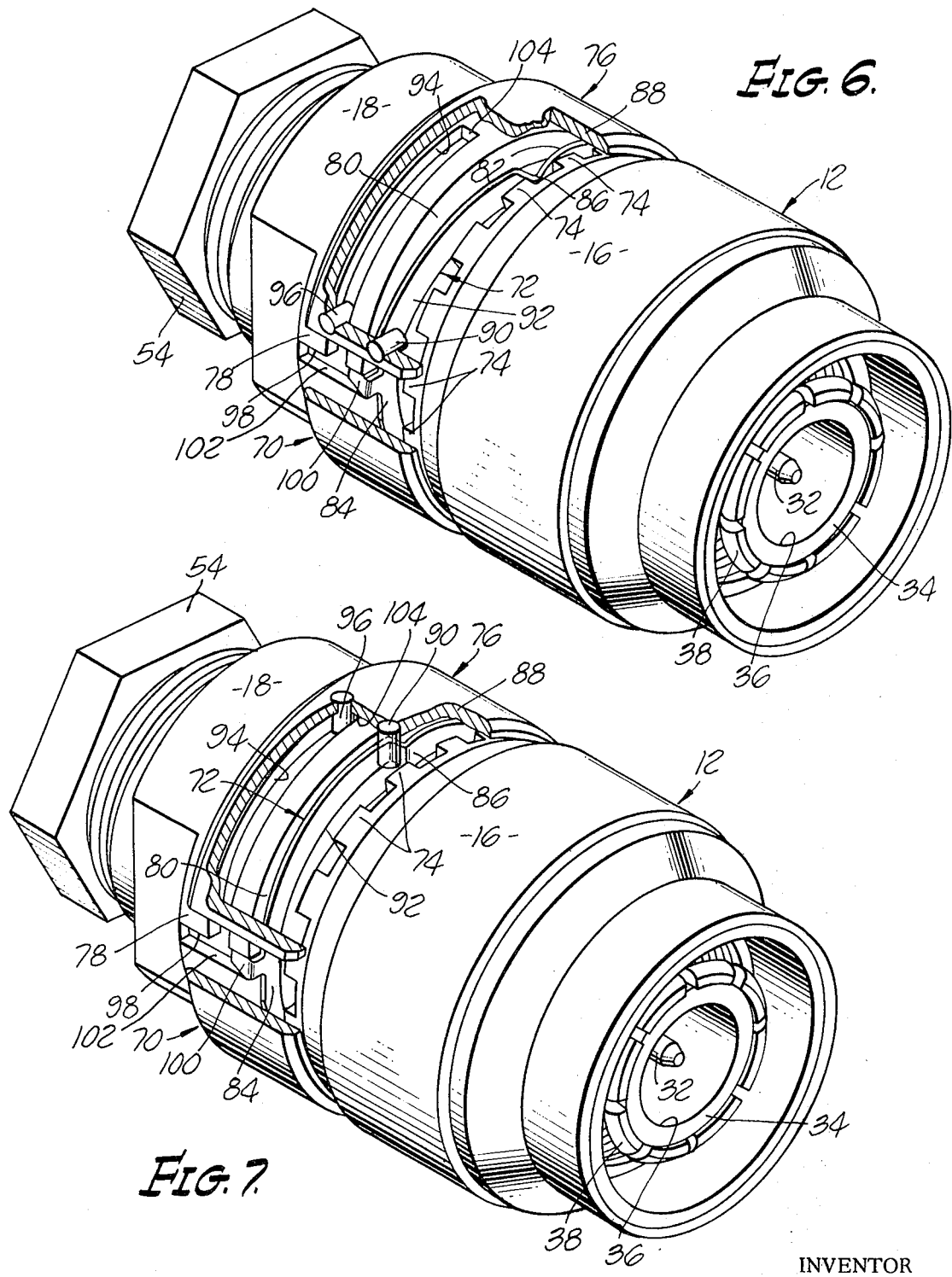

# United States Patent Office 3,517,371
Patented June 23, 1970

---

3,517,371
COUPLING LOCKING DEVICE
Joseph William Buckley, Sepulveda, Calif., assignor to International Telephone and Telegraph Corporation, New York, N.Y., a corporation of Delaware
Filed Mar. 4, 1968, Ser. No. 710,143
Int. Cl. H01r *13/54*
U.S. Cl. 339—89                                10 Claims

ABSTRACT OF THE DISCLOSURE

A coupling locking device such as may be used for locking a coupling nut of an electrical connector. The locking device is a ratchet mechanism in which ratchet teeth are formed on the coupling nut and an axially resilient concave washer is formed with pawls which engage the teeth. A sleeve surrounding the washer carries cam means which retract the pawls from the ratchet teeth upon rotation of the sleeve to a predetermined position. Retraction of the pawls from the ratchet teeth permits the coupling nut to be unscrewed from its mating element.

BACKGROUND OF THE INVENTION

This invention relates to a coupling locking device and, more particularly, to such a device employed on an electrical connector.

While the coupling locking device of the present invention is described as being applied to an electrical connector member, it is to be understood that the device may be applied to other types of tubular members, as for example, conduits for conveying fluids.

Methods for positively locking of connector coupling devices have been in demand in industry for many years. The continuing increase in the severity of the vibration environment in which connectors must survive has resulted in a steadily increasing demand for improved and simplified positive locking connector coupling devices.

Numerous methods for accomplishing this positive locking action for connector couplings, particularly, screw threaded connector coupling elements, are presently in use. Probably the most widespreading method for positively locking a connector coupling nut to a mating connector element is the safety wire technique in which a wire is woven through a series of openings in the coupling nut and mating connector element. This technique has the disadvantage that it is extremely time consuming and difficult to accomplish in confined areas, such as behind instrument panels and in high density areas, and very impractical when the parts are out of view of the technician.

Other means for locking connector coupling nuts include ball-detents, splines and interlocking gear teeth. These devices, however, are quite complex, expensive, and too cumbersome to be practical for small connectors. Nylon and Teflon locking nuts have also been employed but these have a limited life since the nylon or Teflon locking inserts become ineffective after only a few threadings of the coupling nut.

What is needed therefore, is a coupling locking device which is simple in construction, inexpensive, quickly operable and, preferably, capable of miniaturization such as is required when applied to miniature electrical connectors.

SUMMARY OF THE INVENTION

In accordance with the present invention, there is provided a coupling locking device for a rotatable annular coupling member which is adapted to be engaged to a complementary coupling element. One end of the coupling member is provided with ratchet teeth. An axially resilient generally annular pawl element coaxial with the coupling member engages the ratchet teeth in such a manner that the coupling member may be rotated in one direction only, namely, in the direction required to permit engagement of the coupling member to the complementary coupling element. A rotatable cam device is provided which can be rotated to withdraw the pawl element out of engagement with the ratchet teeth and, thus, permit the coupling member to be disengaged from the mating coupling element. Preferably the pawl element is in the form of a concave washer carrying projections on its forward portions which engage the ratchet teeth. The coupling locking device of the invention is simple in construction, requires only two parts in addition to that employed in a conventional coupling and provides a reliable lock for the coupling member after the latter has been fully engaged to its mating coupling element. Moreover, the locking device may be easily and rapidly released to permit fast removal of the coupling member from its mated part. In addition, the invention has the advantage that due to its simplicity it offers patricular utility in the field of miniaturization, such as for miniaturized electrical connectors.

BRIEF DESCRIPTION OF THE DRAWINGS

FIG. 6 is a perspective view of the receptacle connector member in FIG. 1, with portions broken away to show the relative position of the parts of the coupling locking device when the pawl element is engaged with the ratchet teeth of the device; and FIG. 7 is a perspective view similar to FIG. 6 but showing the relative position of the coupling locking device parts when the pawl is disengaged from the ratchet teeth.

DESCRIPTION OF THE PREFERRED EMBODIMENT

Figure 1:
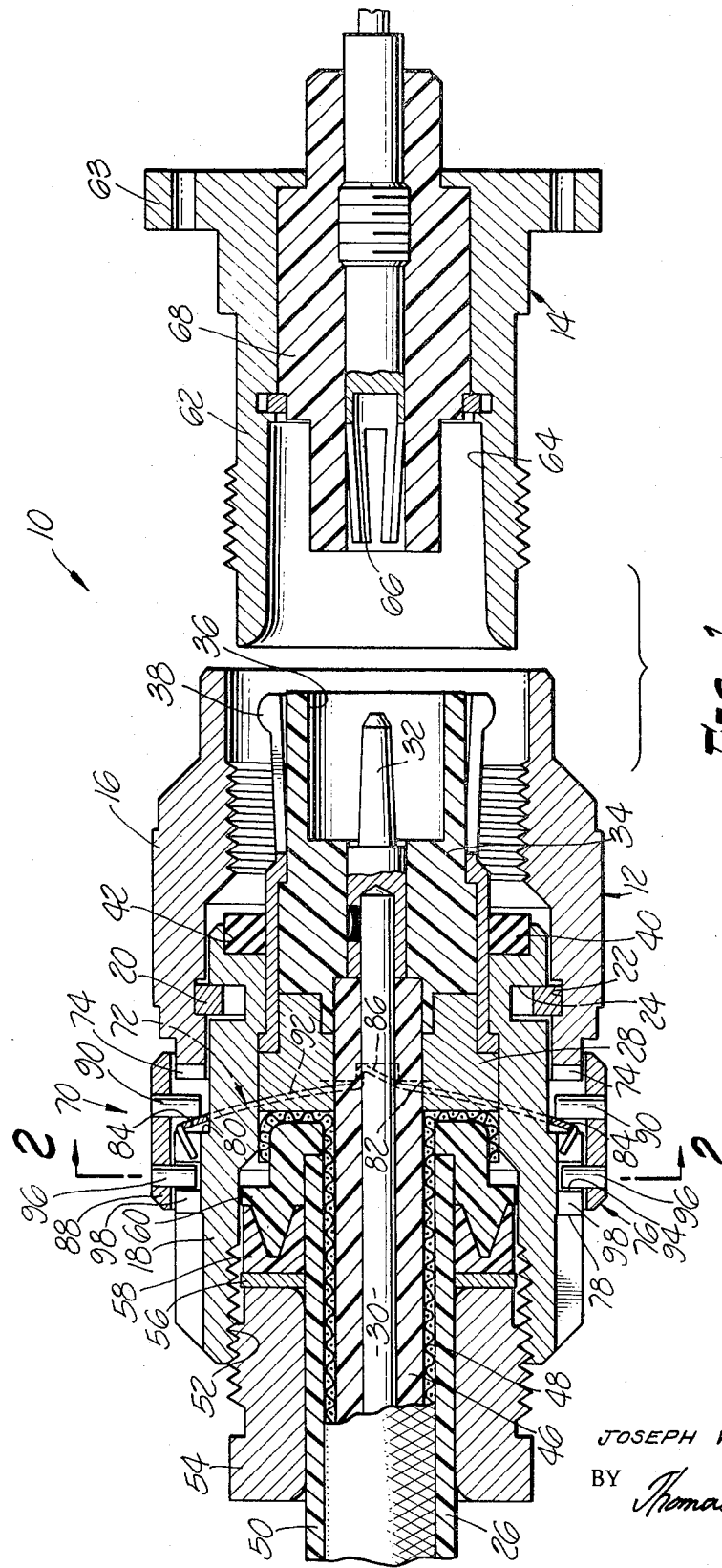
FIG. 1 is a longitudinal partial cross sectional view of an electrical connector embodying the coupling locking device of the present invention, showing the receptacle connector member and jack connector member separated.

Referring now to the drawings in detail, wherein like reference characters designate corresponding parts throughout the various views, there is shown in FIG. 1 the coupling locking device of the invention applied to a coaxial electrical connector, generally designated 10, which includes a receptacle connector member 12 and a jack connector 14.

The receptacle connector member 12 comprises an internally threaded annular coupling nut 16 which is rotatably mounted on the forward end of an annular main connector body 18. A retaining ring 20 positioned in annular grooves 22 and 24 on the coupling nut and main connector body, respectively, axially positions the coupling nut on the body 18.

A connector cable 26 extends into the connector body 18 and passes through bushing 28 positioned intermediate the ends of the connector body. The center conductor 30 of the cable 26 is connected to a male center contact 32. The contact is surrounded by an annular insulator 34 which is formed with a recess 36 opening at its forward end into which the contact 32 extends. An outer annular contact 38 surrounds the insulator 34. An annular interface sealing gasket 40 is retained in an annular recess 42 at the forward end of the body 18.

The cable 26 incluudes, in addition to the center conductor 30, an insulating core 46, a metal cable braid 48, and an outer insulator jacket 50. The interior of the rear portion of the body 18 is threaded as indicated at 52 for receiving an externally threaded cable clamping nut 54. The nut 54 forces a washer 56, sealing gasket 58, and braid clamp 60 toward the bushing 28 to secure the cable braid 48 between the clamp 60 and the rear surface of the bushing 28.

The jack type connector 14 includes an externally threaded main body 62 and a flange 63 for mounting the connector to a panel or the like. A recess 64 in the body 62 opens at its forward end. A female or socket contact 66 is coaxially positioned within the body 62 and separated therefrom by an annular insulator 68. The contact 66 and insulator 68 are positioned in the recess 64 so that when the coupling nut 16 is threaded to the body 62 of the jack connector 14, the male center contact 32 will be engaged in the socket contact 66. The construction of the connector parts 12 and 14 described so far is generally conventional and is given by way of example only, it being understood that the locking device of the present invention could be applied to any form of connector in which a rotatable locking element, such as the coupling nut 16, is engageable with a mating part.

Figure 5:
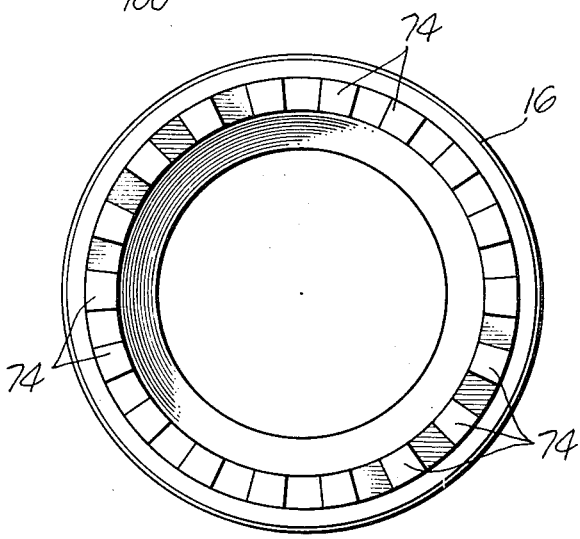
FIG. 5 is a rear elevation of the coupling nut employed on the receptacle connector member in FIG. 1, showing particularly the ratchet teeth thereon.

The coupling nut locking device of the present invention, generally designated 70, includes a pawl element 72. rachet teeth 74, and a cam release mechanism generally designated 76. The rachet teeth 74 are formed on the rear of the coupling nut 16. As best seen in FIG. 5, preferably the rachet teeth have a rectangular configuration so as to be operable with a pawl projection which allows for either clockwise or counterclockwise rotation of the coupling nut.

Figure 3:
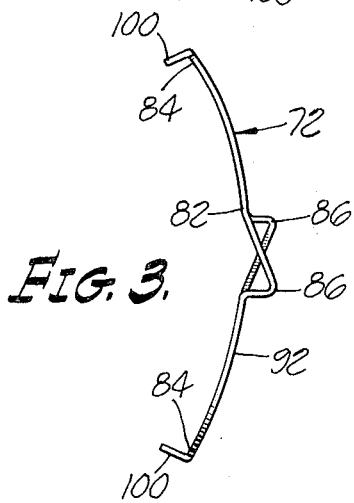
FIG. 3 is a side elevation of the pawl element of the invention.
Figure 4:
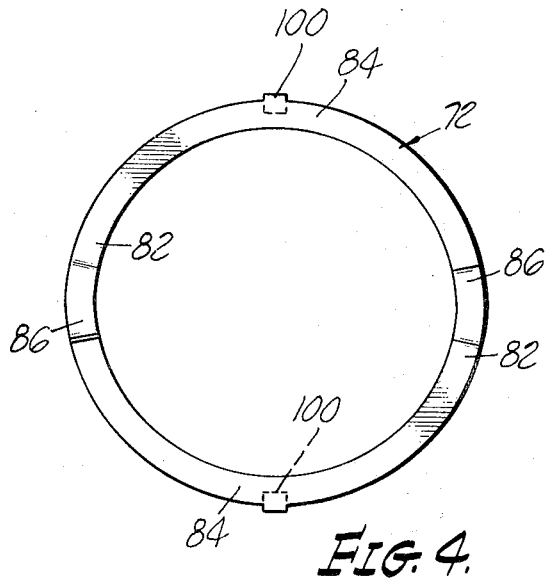
FIG. 4 is a front elevation of the pawl element in FIG. 3.

The main connector body 18 of the receptacle connector member 12 is shaped to provide an annular projection 78 which is spaced from the rear of the coupling nut and provides a shoulder 80 at its forward face. As seen in FIGS. 1, 3 and 4, the pawl element 72 is preferably in the form of a washer or ring which is bent about a line extending diametrically across the ring so as to provide a pair of forward portions 82 adjacent to the rachet teeth and a pair of rear portions 84 which engage the forwardly facing shoulder 80. The ring 72 is sufficiently thin so as to be axially resilient. A pair of pawl projections 86 are formed from the forward portions 82 of the ring, are engaged between the rachet teeth 74, as best seen in FIG. 6, and are shaped in such a manner as to permit clockwise rotation only of the coupling nut 16.

The cam release mechanism 76 comprises a sleeve 88 which surrounds the annular projection 78 and the pawl ring 72. A pair of cam pins 90 are fixedly positioned in the sleeve 88 on diametrically opposite sides thereof, as best seen in FIG. 1, and extend inwardly from the sleeve into the space between the forwardly facing surface 92 on the pawl ring 72 and the rachet teeth 74.

A pair of 90° arcuate grooves 94 are formed in the diametrically opposed sides of the annular projection 78. The sleeve 88 carries a second pair of pins 96 on diametrically opposite sides and spaced rearwardly from the cam pins 90. The pins 96 extend into the grooves 94 so as to axially position the sleeve 88 on the body 18 and to control the extent of rotation of the sleeve on the body.

A pair of axially extending slots 98 are formed in the projection 78 adjacent to one end of the annular grooves 94 to provide a keyway in which there is engaged key elements 100 which are integrally formed parts of the pawl ring 72. The key elements 100 engaging the slots 98 function as antirotation devices for the pawl ring. It can be seen that by making the keyway slots 98 intersect the arcuate grooves 94 on the projection 78, the sleeve 88 carrying the two sets of pins 90 and 96 may be readily assembled to the main connector body 18 by merely aligning the pins with the slots in front of the shoulder 80 and moving the sleeve rearwardly. When the sleeve is positioned with the guide pins 96 axially aligned with grooves 94, the sleeve is rotated to engage the pins in the grooves in the position desired.

When the guide pins are adjacent to the respective opposite ends 102 of the arcuate grooves 94, the cam pins 90 are positioned as seen in FIGS. 1 and 6 wherein the cam pins are adjacent to the rear portions 84 of the pawl ring and the projections 86 of the ring are engaged between the rachet teeth 74. In this position of the pins, the coupling nut 16 may be rotated in a clockwise direction to engage the jack connector 14. The projections 86, however, are so shaped as to prevent reverse rotation of the coupling nut 16 thus securely and reliably locking the nut in position.

Figure 2:
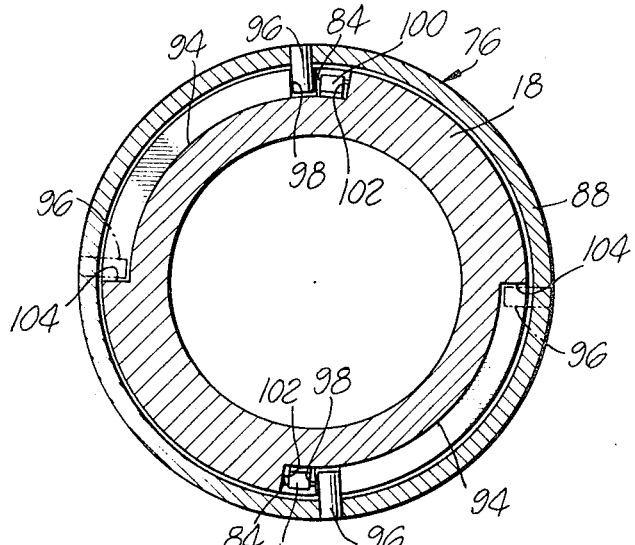
FIG. 2 is a cross-sectional view taken along line 2—2 of FIG. 1, with the inner parts of the connector removed for clarity.

When it is desired to unscrew the nut 16 from the jack connector 14, the sleeve 88 is rotated in a counterclockwise direction to the position shown in FIG. 2 wherein the guide pins 96 assume the position shown in phantom lines adjacent to the respective opposite ends 104 of the guide grooves 94. In this position of the guide pins, the cam pins 90 are in the position seen in FIG. 7 wherein said pins deflect the forward portions 82 of the pawl ring 72 rearwardly thus retracting the projections 86 from the rachet teeth 74. As a consequence, the coupling nut 16 is then free to be rotated in a counterclockwise direction to unscrew from the jack connector 14.

It is thus seen that by the present invention there is provided a very simple coupling locking mechanism which requires basically only three parts, the ratchet teeth 74, the cam releasing mechanism 76, and the pawl ring 72. The pawl ring has a substantial advantage over the more complex detent mechanisms now in use due to its extremely simple construction comprising merely a simple ring structure which may be readily produced by a simple stamping operation. While it is preferred that the ring have a generally concave configuration as best seen in FIG. 3, it is understood that it could take other forms; for example, the ring could be shaped to provide only one forward portion and projection thereon, or three or more projections.

The present invention is not only inexpensive to manufacture due to its simple construction and small number of parts, but also has the advantage that it may be miniaturized for use on miniature electrical connectors, for example. The coupling locking device 76 of the invention is quickly shiftable between its two operative positions, thus avoiding the substantial amount of lost time involved in safety wiring coupling nuts and also may be readily operated in confined areas as well as in blind areas where safety wiring is virtually impossible to accomplish.

Although I have herein shown and described my invention in what is conceived to be the most practical and preferred embodiment, it is recognized that departures may be made therefrom within the scope of the invention, which is not to be limited to the details disclosed herein so as to embrace any and all equivalent structures and devices. Thus, although the coupling locking device illustrated in the drawings and described with reference thereto is embodied in an electrical connector, it could be utilized for hollow tubular conduits, for example, by substituting a relatively large axial bore through each of the connector parts in lieu of the various parts which mount the electrical contacts therein. Various other adaptations would be apparent to those skilled in the art.

What is claimed is:

1. A coupling locking device comprising: a rotatable annular coupling member having a forward portion adapted to be coupled to a complementary engageable coupling element, a plurality of rachet teeth on a rearwardly facing surface of said annular coupling member;

axially resilient non-rotatable generally annular pawl means coaxial with said coupling member and engageable with said teeth so as to permit rotation of said coupling member in one direction only for engagement with said coupling element; a rotatable sleeve coaxial with said pawl means, said sleeve carrying cam means engageable with said pawl means for retracting the latter from engagement with said teeth upon rotation of said sleeve so as to permit rotation of said coupling member in the reverse direction, a cylindrical body extending into said annular pawl means and said sleeve, said body embodying a forwardly facing annular shoulder spaced from said teeth, said annular pawl means being disposed between said shoulder and said teeth; said annular pawl means comprising a ring bent so as to provide a rear portion engaging said shoulder and a forward portion, said forward portion including a projection engageable with said teeth; and said cam means being arranged to engage a forwardly facing surface of said forward portion of said ring upon rotation of said sleeve to deflect said forward portion rearwardly a sufficient distance to retract said projection from engagement with said teeth.

2. A coupling locking device as set forth in claim 1 wherein said cam means comprises at least one inwardly extending pin fixedly secured to said sleeve.

3. A coupling locking device as set forth in claim 1 wherein said body is formed with a keyway adjacent to said ring; and said ring embodying a key element engaged in said keyway to prevent relative rotation between said ring and said body.

4. A coupling locking device as set forth in claim 3 wherein said keyway is axially extending and opens at said shoulder on said body; an annular guide groove on said body communicating with said keyway; and a guide pin extending inwardly from said sleeve and being sufficiently small to pass through said keyway for engagement in said guide groove.

5. A coupling locking device as set forth in claim 1 including guide means maintaining said rotatable sleeve in predetermined axial position on said body.

6. A coupling locking device as set forth in claim 5 wherein said guide means also controls the rotational position of said sleeve on said body.

7. A coupling locking device as set forth in claim 1 wherein said ring is bent about a generally diametrical line extending across the ring so as to provide two of said forward portions and two of said rear portions; one of said projections being provided on each of said forward portions and each projection being shaped to permit rotation of said coupling member in said one direction; and said forward portions being deformable axially toward said shoulder by said cam means upon rotation of said sleeve.

8. A coupling locking device as set forth in claim 7, wherein said projections are integral formed portions of said ring.

9. A coupling locking device as set forth in claim 7 wherein said cam means includes a pair of diametrically opposed pins extending inwardly from said sleeve, said pins being positioned so as to be disengaged from said forward portions of said ring at one rotational position of said sleeve, and said pins engaging the forward surfaces of said forward portions so as to cam them rearwardly at a second rotational position of said sleeve.

10. A coupling locking device as set forth in claim 9 including a pair of arcuate guide grooves on said body behind said shoulder, a pair of diametrically opposed guide pins extending inwardly from said sleeve and engaged in said guide grooves, and said guide grooves being disposed so that when said guide pins are adjacent to one end of the respective guide grooves, said cam pins are adjacent to the rear portions of said ring and, when said guide pins are adjacent to the other end of the respective guide grooves, said cam pins are adjacent to the forward portions of said ring causing said projections to be retracted from said teeth.

References Cited

UNITED STATES PATENTS

| 1,857,420 | 5/1932 | Wolford | 285—85 |
| 2,731,058 | 1/1956 | Smisko | 151—39 |
| 3,201,149 | 8/1965 | Bragg | 285—39 |
| 3,351,886 | 11/1967 | Zimmerman | 339—90 |

FOREIGN PATENTS 857,344  12/1960  Great Britain.

MARVIN A. CHAMPION, Primary Examiner

J. H. McGLYNN, Assistant Examiner

U.S. Cl. X.R.

285—85